United States Patent
Fikany et al.

(10) Patent No.: US 8,486,173 B2
(45) Date of Patent: Jul. 16, 2013

(54) COLLAPSIBLE UNDERHOOD CONTAINER

(75) Inventors: Philip J. Fikany, Troy, MI (US); Michael A. Vieau, II, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 447 days.

(21) Appl. No.: 12/797,674

(22) Filed: Jun. 10, 2010

(65) Prior Publication Data

US 2011/0303308 A1 Dec. 15, 2011

(51) Int. Cl.
| | |
|---|---|
| B01D 50/00 | (2006.01) |
| B01D 59/50 | (2006.01) |
| B01D 39/14 | (2006.01) |
| B01D 39/06 | (2006.01) |
| B01D 24/00 | (2006.01) |
| B60K 11/00 | (2006.01) |
| B60K 13/02 | (2006.01) |

(52) U.S. Cl.
USPC ........... 55/385.3; 55/522; 55/523; 55/524; 180/68.3; 180/68.1; 422/169; 422/170; 422/171; 422/172; 422/177; 422/178; 422/179; 422/180; 422/181; 422/182

(58) Field of Classification Search
USPC ............. 55/522–524, 385.3; 422/169–172, 422/177–182; 180/68.3, 68.1
See application file for complete search history.

(56) References Cited

U.S. PATENT DOCUMENTS

| | | | | |
|---|---|---|---|---|
| 670,404 | A * | 3/1901 | Davis | 312/114 |
| 2,707,527 | A * | 5/1955 | Brace | 55/357 |
| 3,887,223 | A * | 6/1975 | Bez | 293/133 |
| 3,935,923 | A * | 2/1976 | Wheeler | 181/200 |
| 3,959,838 | A * | 6/1976 | Hannah | 15/1.7 |
| 4,548,166 | A * | 10/1985 | Gest | 123/198 E |
| 5,030,264 | A * | 7/1991 | Klotz et al. | 55/481 |
| 5,178,760 | A * | 1/1993 | Solberg, Jr. | 210/451 |
| 5,201,665 | A * | 4/1993 | McCardell et al. | 439/157 |
| 5,213,596 | A * | 5/1993 | Kume et al. | 55/481 |
| 5,785,368 | A * | 7/1998 | Hartmann et al. | 293/134 |
| 6,387,143 | B1 * | 5/2002 | Adiletta | 55/497 |
| 6,481,809 | B1 * | 11/2002 | Richardson | 312/223.2 |
| 7,185,390 | B2 * | 3/2007 | Buchanan, Jr. | 15/250.31 |
| 7,237,635 | B2 * | 7/2007 | Khouw et al. | 180/68.3 |
| 7,635,403 | B2 * | 12/2009 | Nepsund et al. | 55/481 |

(Continued)

FOREIGN PATENT DOCUMENTS

| | | |
|---|---|---|
| DE | 10257072 A1 | 6/2004 |
| DE | 102004007283 A1 | 9/2005 |
| DE | 102004007284 A1 | 9/2005 |
| DE | 102004054274 A1 | 5/2006 |

(Continued)

*Primary Examiner* — Amber Orlando

(57) ABSTRACT

A collapsible underhood container for mounting under a vehicle hood with a portion of the collapsible underhood container extending into an area between the hood and an underhood safety plane when in an extended position, the container comprising: a lower housing, an upper container portion and a locking feature. The lower housing is fixed relative to the vehicle and has a bottom and side walls. The upper container portion has walls adjacent to and telescopically slidable on the side walls of the lower housing and a top, with the top located in the area between the hood and the safety plane. The locking feature maintains the upper container relative to the lower housing when in the extended position and releases the upper container portion to slide downward relative to the lower housing to a collapsed position when the hood contacts the upper container.

6 Claims, 4 Drawing Sheets

U.S. PATENT DOCUMENTS

| | | | |
|---|---|---|---|
| 7,976,604 B2 * | 7/2011 | Desjardins | 55/503 |
| 2007/0228234 A1 * | 10/2007 | Doyle | 248/188.5 |
| 2008/0092500 A1 * | 4/2008 | Waltenberg et al. | 55/478 |
| 2009/0223732 A1 | 9/2009 | Spannbauer | |

FOREIGN PATENT DOCUMENTS

| | | |
|---|---|---|
| DE | 202007012689 U1 | 3/2009 |
| JP | 200557842 A | 3/2005 |

* cited by examiner

COLLAPSIBLE UNDERHOOD CONTAINER

BACKGROUND OF INVENTION

The present invention relates generally to containers for assemblies located just below a vehicle hood, and more specifically to containers that are configured to collapse upon impact with an underside of the hood.

Underhood packaging space is very limited for typical automotive vehicles, with small cars and hybrid vehicles creating even more difficulty in packaging components under the hood. In addition, in some countries, pedestrian protection requirements are being implemented regarding vehicle-pedestrian collisions. These may include requirements relating to absorption of kinetic energy by a hood when impacted by a pedestrian. In an effort to meet these requirements, this sometimes results in a hood design that will allow the hood to give when a pedestrian falls on it. In order to allow the hood to give, there needs to be clearance immediately under the hood, giving the hood room to deflect. Thus, an underhood safety plane is established just below the hood that no components are allowed to protrude through. But this reduces the already limited packaging space even further, making packaging of some underhood components difficult.

SUMMARY OF INVENTION

An embodiment contemplates a collapsible underhood container for mounting under a vehicle hood with a portion of the collapsible underhood container extending into an area between an underside surface of the hood and an underhood safety plane when in an extended position, the collapsible underhood container comprising: a lower housing, an upper container portion and a locking feature. The lower housing is fixed relative to the vehicle and has a bottom and side walls extending upward from the bottom. The upper container portion has walls adjacent to and telescopically slidable on the side walls of the lower housing and a top connected to the walls, with the top located in the area between the underside surface of the hood and the underhood safety plane when the collapsible underhood container is in the extended position. The locking feature maintains the upper container portion relative to the lower housing when in the extended position and releases the upper container portion to slide downward relative to the lower housing to a collapsed position when the hood contacts the top of the upper container with a sufficient force.

An embodiment contemplates a method of locating and operating a collapsible underhood container in a vehicle, the method comprising the steps of: telescopically sliding an upper container portion onto a lower housing until a locking feature secures the upper container portion relative to the lower housing in a container extended position; mounting the lower housing in fixed relation relative to the vehicle such that a top of the upper container portion is located between a vehicle hood and an underhood safety plane when in the container extended position; impacting the hood with a downward force causing an underside surface of the hood to contact the top of the upper container; and releasing the locking feature, allowing the upper container portion to slide downward relative to the lower housing into a collapsed position, when the downward force of the hood onto the top of the upper container exceeds a predetermined force.

An advantage of an embodiment is that the collapsible underhood container can be mounted with part of the container protruding through an underhood safety plane, effectively increasing the underhood packaging space, while still allowing the pedestrian impact requirements to be met.

DETAILED DESCRIPTION

Figure 1:
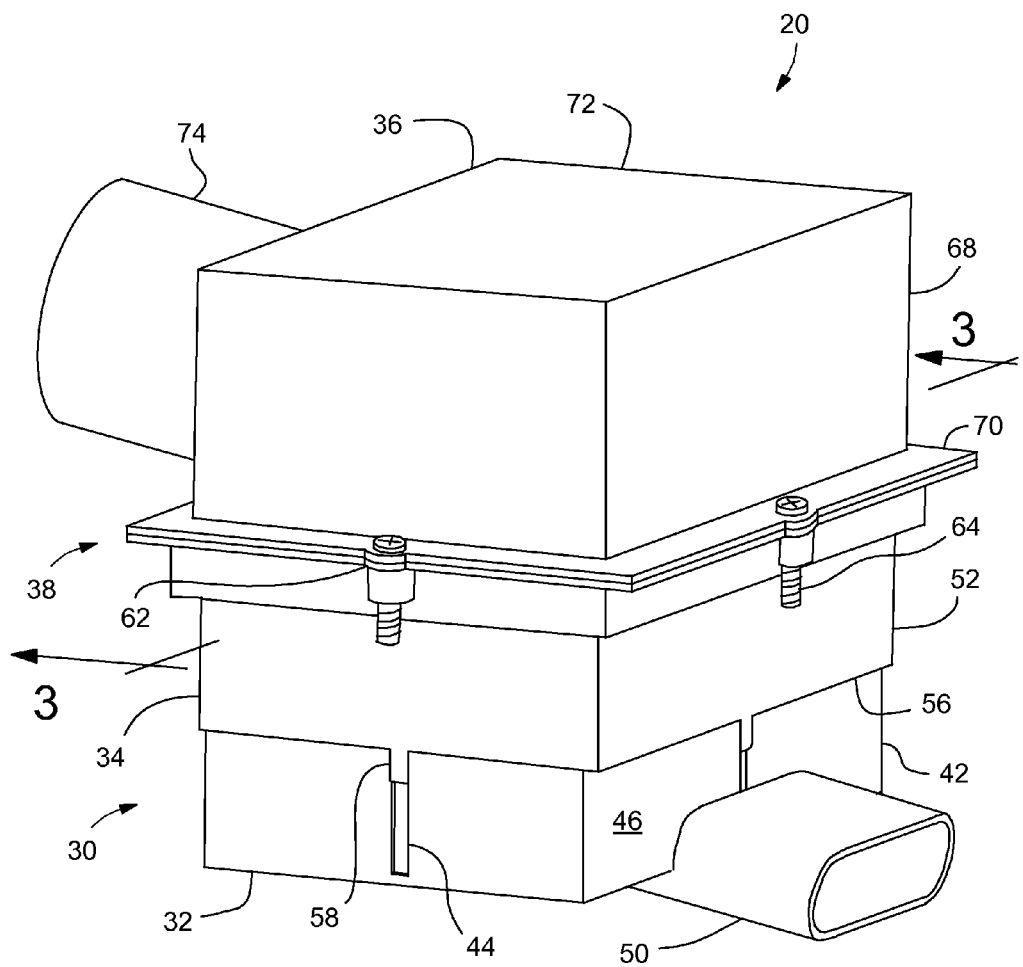
FIG. 1 is a s perspective view of a collapsible underhood container shown in an extended position.
Figure 2:
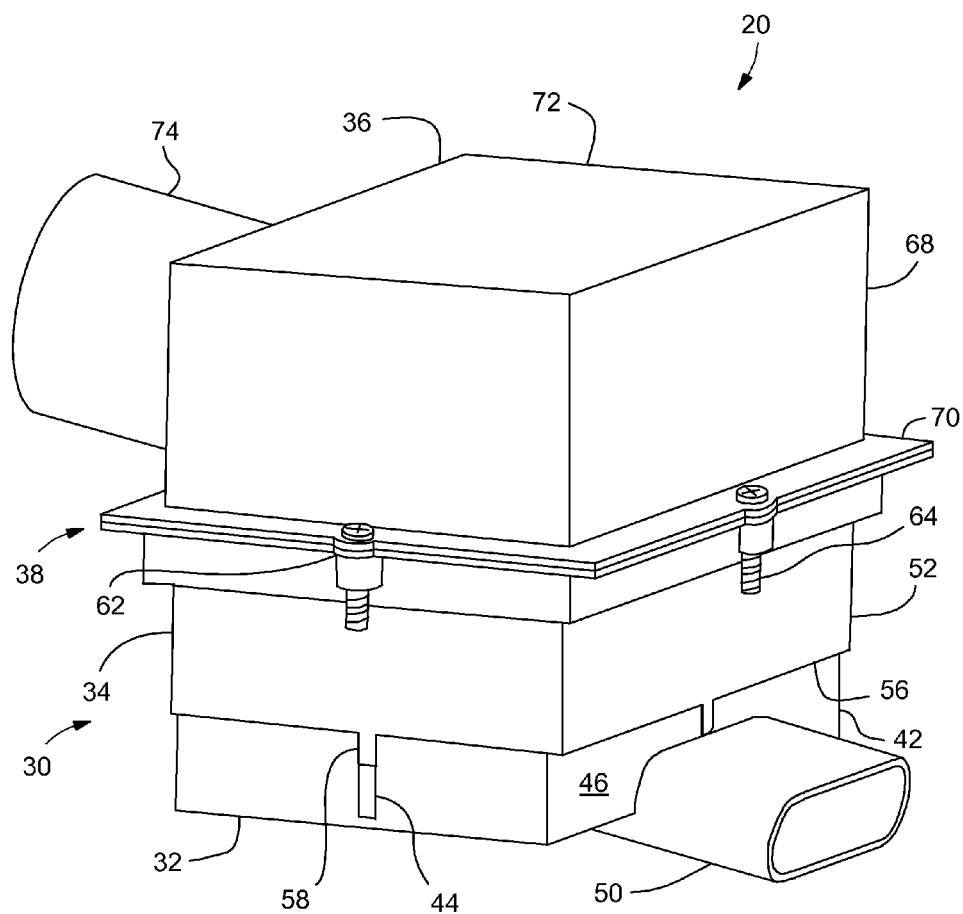
FIG. 2 is a perspective view of the collapsible underhood container shown in a collapsed position.
Figure 3:
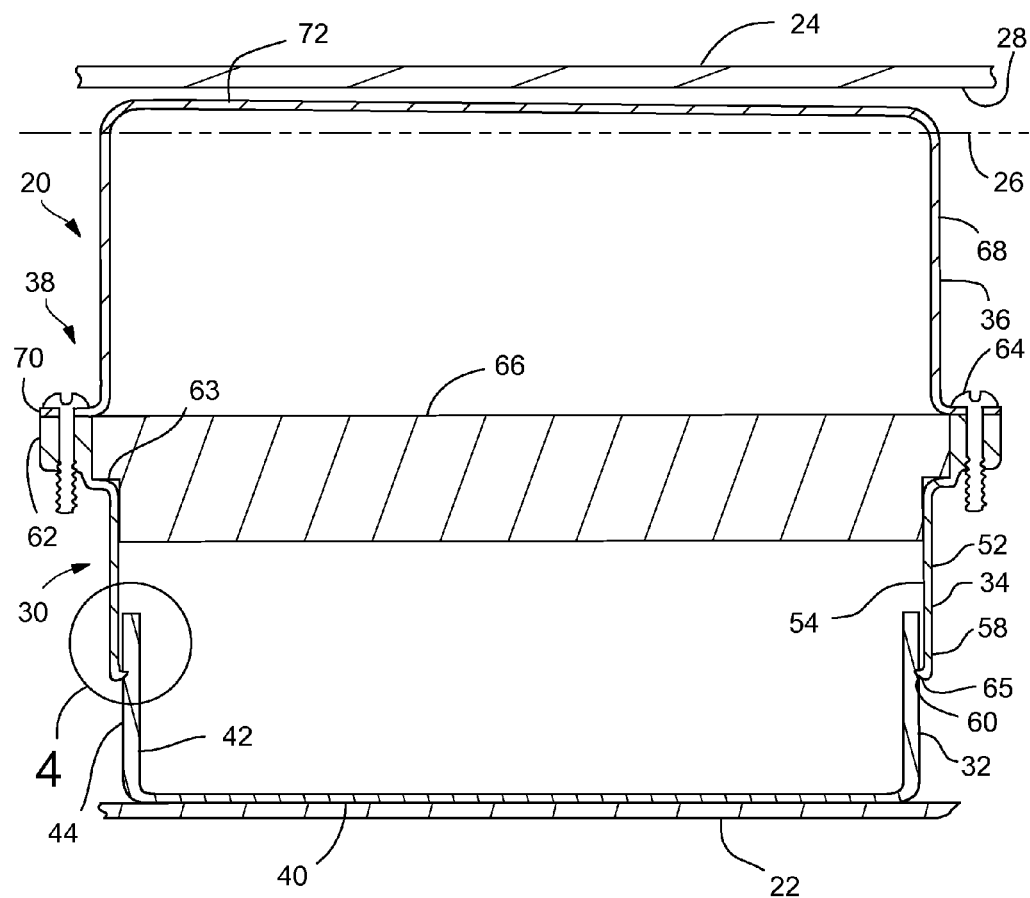
FIG. 3 is a cross sectional view taken along line 3-3 in FIG. 1, showing the collapsible underhood container mounted on a mount under a vehicle hood.
Figure 4:
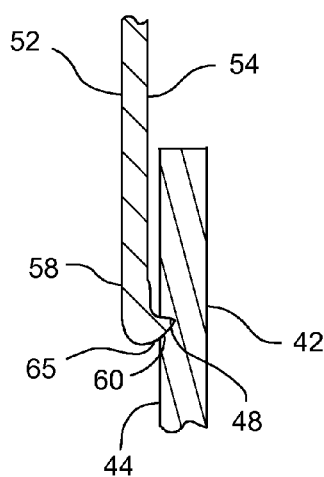
FIG. 4 is a view, on an enlarged scale, of encircled area 4 in FIG. 3.
Figure 5:
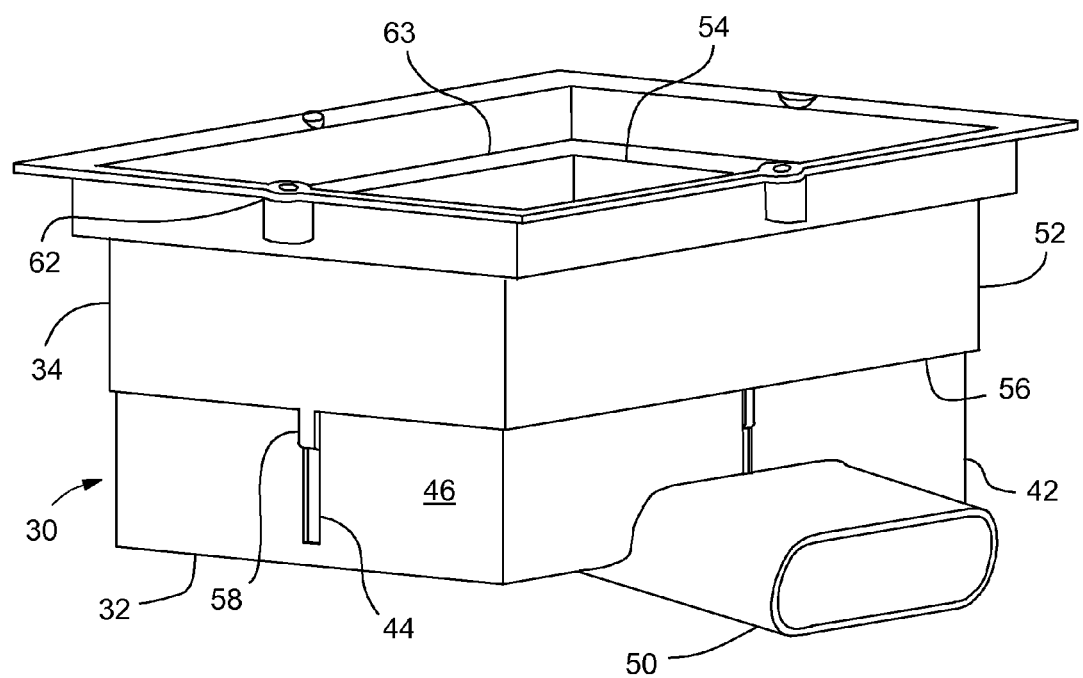
FIG. 5 is a perspective view of a housing portion of the collapsible underhood container.

Referring to FIGS. 1-5, a collapsible underhood container 20 is shown. The container 20 is supported in the vehicle by a mount 22 (shown only in FIG. 3). The mount 22 may be a bracket or shelf or other mechanism for securing the container 20 to the vehicle. The container 20 is located under a vehicle hood 24 (shown only in FIG. 3), with a portion of the container 20 breaking an underhood safety plane (also called a pedestrian protection plane) 26 (shown only in FIG. 3). That is, a portion of the container 20 is closer to an underside surface 28 of the hood 24 than the plane 26 when the container 20 is in its extended position (shown in FIGS. 1 and 3). The plane 26 is an imaginary plane a predetermined distance from the underside surface 28 of the hood 24 defining an area in which no engine or other components are located in order to allow the hood to flex downward by that distance should a pedestrian be hit by the car and thrown onto the hood 24.

The container 20 includes a housing 30, which has a lower housing 32 and a separate upper housing 34, and a lid 36. The lower housing 32 is secured to the mount 22, and so is in a fixed position relative to the vehicle. The upper housing 34 is telescopically mounted to the lower housing 32, and the lid 36 is secured to the upper housing 34. The upper housing 34 and lid 36 telescopically slide on the lower housing 32 as a unit, in effect forming an upper container portion 38.

The lower housing 32 includes bottom 40 from which side walls 42 extend in a generally vertical direction. The term generally vertical means that the side walls 42 may extend vertically or may extend slightly off from vertical. This may occur because the hood 24 is not perfectly flat or horizontal, so the side walls 42 may angle, if so desired, so that they extend normal to the underside surface 28 of the hood 24. Each of the side walls 42 may include a guide channel 44 extending generally vertically along the walls 42 and recessed into the outside surface 46 of each wall 42. A catch 48 (shown in FIGS. 3 and 4) may be recessed into each side wall 42 within each guide channel 44. In addition, if the container 20 is, for example, an air cleaner assembly, then the lower housing 32 may also include a first air flow opening 50.

The upper housing 34 may include side walls 52 having inside surfaces 54 that parallel and slide telescopically over the outside surfaces 46 of the lower housing side walls 42. Extending down from a bottom edge 56 of each side wall 52 is a guide flange 58. Each guide flange 58 is sized and located so that it fits into and telescopically slides in a respective one of the guide channels 44. At the bottom of each guide flange 58 is a locking flange 60 (shown in FIGS. 3 and 4). The guide flanges 58 extend so that the locking flanges 60 are biased into their respective catches 48. Each of the locking flanges 60 are shaped somewhat like a barb in that the locking flanges 60 will flex out of the catches 48 with a much smaller downward force placed on the upper housing 34 than upward force. Each locking flange 60 and corresponding catch 48 thus forms a locking feature 65 that holds the lower and upper housings 32, 34 in an extended position (shown in FIGS. 1 and 3) during vehicle operation but will allow the upper housing 34 to slide downward on the lower housing 32 into a collapsed position (shown in FIG. 2) upon a sufficient downward force being placed on the upper housing 34. The upper housing 34 also includes a set of house mating flanges 62 that are shaped to receive and retain fasteners 64. In addition, if the container 20 is, for example, an air cleaner assembly, then the side walls 52 may include a support ledge 63 for supporting a device 66 (shown in FIG. 3), such as an air filter, within the housing 30.

The lid 36 includes four walls 68 from which a lid mounting flange 70 extends. The lid mounting flange 70 mates with the house mounting flanges 62 and includes holes through which the fasteners 64 extend to secure the lid 36 to the upper housing 34. The lid 36 also includes a top 72 mounted on the walls 68. In addition, if the container 20 is, for example, an air cleaner assembly, then the lid 36 may include a second air flow opening 74.

The assembly and operation of the container 20 will now be discussed. The upper housing 34 may be assembled to the lower housing 32 by flexing the guide flanges outward 58 while sliding them along the guide channels 44 until the locking flanges 60 engage with the catches 48. At this point, the guide flanges 58 flex inward, holding the locking flanges 60 in the catches 48, which holds the housing 30 in its extended position (shown in FIGS. 1 and 3). The shape of the locking flanges 60 generally prevents the upper housing 34 from being pulled upward off of the lower housing 32, which keeps the assembly intact during normal vehicle operation. Any devices 66 may be assembled into the container 20, and then the lid 36 may be placed on the housing 30, with the fasteners 64 or other means of clamping or securing the two together. The lower housing 32 is secured to the mount 22. When mounted on the mount 22 in the extended position, the top 72 of the lid 36 is located between the underhood safety plane 26 and the underside surface 28 of the hood 24.

Should a pedestrian have the misfortune of falling onto the hood 24, the hood 24 can move down so that the underside surface 28 of the hood 24 is at the underhood safety plane 26. If this happens, when the underside surface 28 impacts the top 72 of the lid 36, the force of this impact will cause the locking flanges 60 to disengage from their catches 48, with the guide flanges 58 sliding downward in the guide channels 44 to the container collapsed position (shown in FIG. 2). Thus, the container 20 makes better use of the limited underhood packaging space while allowing the pedestrian hood protection to comply with safety requirements. The collapsed container is not broken in this impact. One merely pulls the upper housing 34 upward relative to the lower housing 32 until the locking flanges 60 again engage the catches 48.

The particular geometry of the locking flanges 60 and catches 48, which may include such factors as tooth depth, tooth shape, the length, width and thickness of the flanges and catches, and the angle of engagement, as well as the material properties of the locking flanges 60 and catches 48, may be varied to attain the desired kinematic response. Thus, the force required to allow for the collapse can be set as desired.

Various alternatives for the collapsible underhood container 20 may be employed. For example, the upper container portion 38 (i.e., the upper housing 34 and lid 36) may be a single, integral part. In such a case, the devices may be loaded into the container 20 prior to installing the upper container portion 38 onto the lower housing 32. In another alternative, the walls of the upper housing may slide on the inside of the lower housing walls, and/or the channels may be on the upper housing with the guide flanges on the lower housing.

Also, while the collapsible underhood container 20 has been illustrated in the figures in a configuration that can act as an air cleaner assembly, the container may be configured to hold other types of devices. For example, the container may be configured to be a battery electrical center that holds electronics, with an air gap in the electrical container used for cooling purposes. This are gap, then, would allow for room to collapse the container should a pedestrian-hood impact occur.

In addition, while the locking flanges 60 and catches 48 that form the locking features 65 are shown as somewhat of a barb or hook biased into a recess, other types of locking features can be used where the two housings are held in an extended position, with the force that will pull the two halves of the housing apart being greater than the force allowing the two halves of the housing to telescopically slide together to a collapsed position.

While certain embodiments of the present invention have been described in detail, those familiar with the art to which this invention relates will recognize various alternative designs and embodiments for practicing the invention as defined by the following claims.

What is claimed is:

1. A collapsible underhood container for mounting under a vehicle hood with a portion of the collapsible underhood container extending into an area between an underside surface of the hood and an underhood safety plane when in an extended position, the collapsible underhood container comprising:

a lower housing configured to be fixed relative to the vehicle and having a bottom and a plurality of side walls extending upward from the bottom, the lower housing including a first airflow opening;

an upper container portion including an upper housing, having a plurality of side walls adjacent to and telescopically slidable on the side walls of the lower housing, and a lid, having a plurality of walls non-slidably secured to the side walls of the upper housing and a generally horizontal top connected to the walls, the top configured to be located in the area between the underside surface of the hood and the underhood safety plane when the collapsible underhood container is in the extended position, the lid also including a second airflow opening;

a locking feature configured to maintain the upper container portion relative to the lower housing when in the extended position and to release and allow the upper container portion to slide downward relative to the lower housing to a collapsed position when the hood contacts the top of the upper container; and an air filter non-slidably mounted relative to the upper housing and the lid such that the air filter remains in a fixed position relative to the upper housing and the lid in both the extended position and the collapsed position, the air filter located above the first air flow opening and below the second air flow opening in both the extended and collapsed positions wherein air flow between the first and second air flow openings through the air filter occurs in both the extended and collapsed positions.

2. The collapsible underhood container of claim 1 wherein the locking feature includes a plurality of generally vertically oriented guide channels recessed into the side walls of the lower housing and a plurality of corresponding guide flanges extending downward from the upper container portion and slidably received in the respective guide channels.

3. The collapsible underhood container of claim 2 wherein each of the guide channels includes a catch recessed therein, and each of the guide flanges includes a locking flange biased into engagement within a respective one of the catches when the collapsible underhood container is in the extended position.

4. A method of locating and operating a collapsible underhood container in a vehicle, the method comprising the steps of:
  (a) mounting an air filter into an upper housing;
  (b) securing a lid on top of the upper housing to fix a position of the air filter relative to both the lid and the upper housing;
  (c) telescopically sliding vertical walls of the upper housing onto a lower housing until a locking feature secures the upper housing relative to the lower housing in a container extended position, the air filter being located below a first airflow opening in the lid and above a second airflow opening in the lower housing in the extended position;
  (d) mounting the lower housing in fixed relation relative to the vehicle such that a top of the lid is located between a vehicle hood and an underhood safety plane when in the container extended position;
  (e) impacting the hood with a downward force causing an underside surface of the hood to contact the top of the upper container;
  (f) releasing the locking feature, causing the upper housing, the lid and the air filter to slide downward in unison relative to the lower housing into a collapsed position when the downward force of the hood onto the top of the upper container exceeds a predetermined force, the air filter being located below the first air flow opening and above the second airflow opening in the collapsed position; and
  (g) directing airflow between the first and second airflow openings and through the air filter in both the extended and collapsed positions.

5. The method of claim 4 wherein step (a) is further defined by providing the locking feature with a plurality of generally vertically oriented guide channels recessed into a plurality of side walls of the lower housing and a plurality of corresponding guide flanges extending downward from the upper container portion and slidably received in the respective guide channels.

6. The collapsible underhood container of claim 2 wherein one of the guide channels is located above and adjacent to the first airflow opening and a corresponding one of the guide flanges is mounted in the one guide channel and extends downward from one of the walls of the upper housing such that the one guide flange is spaced from the first air flow opening in the extended position and the one guide flange abuts the first air opening in the collapsed position to prevent further downward sliding of the upper container portion relative to the lower housing.

* * * * *